United States Patent
Rohden

(10) Patent No.: US 9,394,910 B2
(45) Date of Patent: Jul. 19, 2016

(54) MAGNUS ROTOR

(75) Inventor: Rolf Rohden, Aurich (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 679 days.

(21) Appl. No.: 13/822,985

(22) PCT Filed: Sep. 9, 2011

(86) PCT No.: PCT/EP2011/065672
§ 371 (c)(1),
(2), (4) Date: Jun. 3, 2013

(87) PCT Pub. No.: WO2012/034947
PCT Pub. Date: Mar. 22, 2012

(65) Prior Publication Data
US 2013/0236313 A1    Sep. 12, 2013

(30) Foreign Application Priority Data
Sep. 16, 2010  (DE) .................. 10 2010 040 906

(51) Int. Cl.
*B63H 9/02*  (2006.01)
*F04D 19/00* (2006.01)

(52) U.S. Cl.
CPC *F04D 19/00* (2013.01); *B63H 9/02* (2013.01); *Y02T 70/58* (2013.01)

(58) Field of Classification Search
None
See application file for complete search history.

(56) References Cited

U.S. PATENT DOCUMENTS

| | | | |
|---|---|---|---|
| 1,697,779 A | 6/1925 | Roos | |
| 4,193,305 A | 3/1980 | Hunter | |
| 4,401,284 A | 8/1983 | Austin | |
| 4,602,584 A | 7/1986 | North et al. | |
| 2006/0045743 A1* | 3/2006 | Bertolotti | F03D 1/0633 416/143 |
| 2007/0283869 A1* | 12/2007 | Quinn | B63B 1/121 114/248 |
| 2009/0241820 A1 | 10/2009 | Rohden | |

FOREIGN PATENT DOCUMENTS

| | | |
|---|---|---|
| AT | 110303 | 8/1928 |
| CH | 116 268 | 8/1926 |
| CN | 101454197 A | 6/2009 |
| DE | 558 426 | 9/1932 |
| DE | 1 792 436 | 7/1959 |
| DE | 54 215 | 10/1969 |
| DE | 3402065 C1 | 4/1985 |
| DE | 255923 A1 | 4/1988 |
| DE | 3927712 C2 | 6/1993 |
| DE | 699 16 676 T2 | 6/2005 |
| DE | 102005062615 A1 | 6/2007 |

(Continued)

OTHER PUBLICATIONS

International Search Report from PCT/EP2011/065672 mailed Oct. 20, 2011 (2 pages).

(Continued)

*Primary Examiner* — Ninh H Nguyen
*Assistant Examiner* — Justin Seabe
(74) *Attorney, Agent, or Firm* — Seed Intellectual Property Law Group PLLC

(57) ABSTRACT

A Magnus rotor comprising a support that is arranged inside the Magnus rotor, a rotor that rotates about the support during operation of the Magnus rotor, a bearing that supports the rotor on the support, and a shaft that penetrates the bearing and is connected to the rotor above the bearing.

16 Claims, 16 Drawing Sheets

(56) References Cited

FOREIGN PATENT DOCUMENTS

| DE | 102006025732 B4 | 5/2010 | | |
|---|---|---|---|---|
| EP | 1443262 A2 | 8/2004 | | |
| GB | 2 332 891 A | 7/1999 | | |
| JP | 2012-510923 A | 5/2012 | | |
| SE | WO 9206295 A1 * | 4/1992 | ............. | F03D 1/003 |
| WO | 2006133950 A2 | 12/2006 | | |
| WO | 2010/066946 A2 | 6/2010 | | |

OTHER PUBLICATIONS

Wagner, Claus D.: Die Segelmaschine. Hamburg. Ernst Kabel Verlag GmbH, 1991, pp. 85, 156-159.—ISBN 3-8225-0158-1.
International Search Report from PCT/EP2011/065984 mailed Feb. 16, 2012 (4 pages).
Muhs, D. et al., "ROLOFF/MATEK: Maschinenelemente", 17th edition, Wiesbaden: Friedr. Verweig & Sohn Verlag/GWV Fachverlage GmbH, 2005, 6 pages—ISBN 3-528-17028-X.

* cited by examiner

MAGNUS ROTOR

BACKGROUND

1. Technical Field

The invention concerns a Magnus rotor.

Magnus rotors are also referred to as Flettner rotors or sailing rotors.

2. Description of the Related Art

Magnus rotors are known in the state of the art. Particularly as ship drives, they have also become known by the term Flettner rotors and equipping ships with such a Flettner rotor or Magnus rotor is described in the book Die Segelmaschine' by Klaus D Wagner, Ernst Kabel Verlag GmbH, Hamburg, 1991.

CH 116268 discloses a Magnus rotor which is carried on a pivot. In that arrangement the Magnus rotor can be rotated in various different ways. On the one hand, provided at the inner periphery of the Magnus rotor are guide wheels which serve as a rotor drive. On the other hand those guide wheels serving as the rotor drive can be provided outside the rotor periphery. In addition the drive for the rotor can be arranged centrally relative to the rotor in such a way that the one part of a motor driving the cylindrical rotor is fixedly connected to the pivot and the other part is connected to the rotating cylinder.

What is common in that respect to all the above-described Magnus rotor drives is that the rotating cylinder of the Magnus or Flettner rotor is driven.

As general state of the art attention is directed to the following documents: WAGNER, Claus D: Die Segelmaschine, Hamburg: Ernst Kabel Verlag GmbH, 1991, pages 156, 158, 159—ISBN 3-8225-0158-1; DE 558 426 A; U.S. Pat. No. 4,602,584 A; DD 255 923 A1; DE 10 2005 062 615 A1; U.S. Pat. No. 4,401,284 A; ROLOFF/MATEK: Maschinenelemente, 17th edition, Wiesbaden: Friedr. Verweig & Sohn Verlag/GWV Fachverlage GmbH, 2005, pages 557-559—ISBN 3-528-17028-X; U.S. Pat. No. 1,697,779 A; DE 10 2006 025 732 B4 and AT 110 303 B.

BRIEF SUMMARY

According to an embodiment of the invention there is provided a Magnus rotor comprising a carrier arranged in the interior of the Magnus rotor, a rotor which in operation of the Magnus rotor rotates about the carrier, a bearing which carries the rotor on the carrier, and a shaft which is arranged through the bearing and which is connected to the rotor above the bearing.

It is advantageous with that kind of a drive for a Magnus rotor that a shaft can be provided on the center line of the Magnus rotor to drive the rotor on that line. In that way all drive components can be provided within the carrier and rotation of the rotor can be transmitted by means of the shaft from the interior of the carrier to the rotor. Thus rigidly interconnected mechanical components are provided above the bearing while the drive components can be provided in the interior of the carrier beneath the bearing.

In an aspect of the invention the Magnus rotor has a motor which is arranged in the interior of the carrier and drives the shaft in rotation. In that way the drive for the shaft can be securely disposed in the interior of the carrier, protected from weather and environmental influences. It is precisely on the deck of a ship that at sea there can be severe weather influences such as wind and rain, which can attack the components of the drive and which require suitable protection from the weather. It is possible to dispense with such additional protection if the drive is provided in the interior of the carrier. In that respect such weather conditions can also make it difficult for the operating personnel to carry out maintenance and so forth. In contrast, it is possible to work within the interior of a Magnus rotor, irrespective of the weather and the time of day, under conditions which are more pleasant for the operating personnel. Furthermore maintenance and so forth is simplified as there is no need for additional protective elements to give protection from the weather, which would have to be removed in the maintenance procedure.

In a further aspect of the invention both the motor and also the shaft have a gear. The gear of the motor drives a toothed belt in rotation, which drives the shaft in rotation by way of the gear. In that way the shaft is driven by means of a robust and tried-and-tested working principle in order in turn to drive the rotor in rotation.

In an aspect of the invention the motor is provided on a tensioning device, wherein the tensioning device, which is a movable member, is radially displaceably connected to the carrier. In that way the toothed belt between the motor and the shaft can be tensioned or relieved of tension in order to replace it or also to predetermine the tension on the toothed belt.

In an aspect of the invention the Magnus rotor has a housing which at least laterally and upwardly and radially closes off the motor and/or the gear and/or the toothed belt and/or the gear and/or the part of the shaft, that is arranged in the interior of the carrier. That is advantageous on the one hand thereby to protect the personnel from the moving components of the drive and on the other hand to protect the drive from fouling or damage due to the ingress of objects and foreign bodies between the moving components.

In an aspect of the invention at its top side the motor has at least one fixing point and at its inside above the motor the carrier has at least one fixing point. Provided between the fixing point of the motor and the fixing point of the carrier is a fixing means for transmitting the force due to the weight of the motor by way of the fixing point of the motor to the fixing point of the carrier. In that way the motor is protected from dropping down within the interior of the carrier, if the fixing means with which the motor is fixed in the interior of the carrier unintentionally come loose.

In a further aspect of the invention the Magnus rotor has a shaft fixing device provided at the upper end of the shaft above the bearing, and a rotor fixing device connecting the shaft fixing device to the rotor. The shaft and the rotor are fixedly and rigidly connected together by way of those elements.

In a further aspect of the invention there is provided a Magnus rotor having a guide roller which is arranged at the lower outer periphery of the Magnus rotor and which bears play-free against the Magnus rotor, a walkway surface arranged beneath the guide roller, and a cover which covers the guide roller and the walkway surface. In an opened condition the cover clears the guide roller and the walkway surface in such a way that a person on the walkway surface can carry out working operations at the guide roller. An advantage of that walkway surface is that this avoids the necessity for the personnel having to establish access to the corresponding guide roller for maintenance or replacement operations by way of a ladder or working platform. It is precisely on the deck of a ship that such a ladder or working platform could be safeguarded against slipping or movement, only with a major amount of complication and expenditure. In addition, in the case of a ship's deck which is always wet due to rain and spray it is never possible to completely eliminate the risk of slipping, which also causes for example ladders or working platforms to slip out of position. Thus ladders, working platforms and similar aids for reaching a guide roller always represent a source of danger to the operating personnel, which according to the invention can be avoided by the walkway surface provided beneath or beside the guide roller. In addition, beside a cover in the downwardly folded condition, there may be no space or scarcely any space to position a ladder or working platform there, or at least in such a way that access to the guide roller to be able to carry out the working operations is possible therefrom. In addition setting up and removing a ladder or a working platform represents additional complication which can be avoided by the provision of an integrated walkway surface. Thus the provision of the walkway surface according to the invention under the guide roller means that the work in itself is not only safer but can also be carried out more easily and with a greater saving of time.

In an aspect of the invention the walkway surface is in the form of part of a base plate or a ship's deck or the like, on which the Magnus rotor is fixed. That ensures that the walkway surface cannot move relative to the ship's deck as it is in the form of part of the deck, that is to say it is a part of the ship's deck or also the foot or substructure of the Magnus rotor.

In a further aspect of the invention the walkway surface is provided with a surface or the surface is coated to prevent slipping on the walkway surface. That is advantageous to reduce the risk of slipping when walking on the walkway surface or standing thereon as it is precisely when carrying out operations on a ship's deck that the operating personnel is seriously endangered by tripping over or falling, for example by falling overboard.

In an aspect of the invention the cover has a motion device adapted to hold the cover in the opened condition at a vertical height above the walkway surface. That motion device on the one hand permits the cover or each cover segment to be folded up and down. On the other hand that prevents the cover segment from being folded down or also dropping down completely on to the underlying surface or the ship's deck as the cover segment can be held at a given height above the underlying surface or ship's deck by the motion device. In that case it is advantageous for that given height to be so selected that the cover segment is positioned at least partially above the walkway surface. That arrangement can provide that the cover segment in the folded-down condition affords protection preventing a person who is on the walkway surface from falling on to the underlying surface or the ship's deck.

In a further aspect of the invention the motion device is adapted to extend in the opened condition of the cover in a substantially radial direction of the Magnus rotor from same to the opened cover above the walkway surface. In that way the downwardly folded cover rearwardly and/or the motion device towards the sides jointly or alone form protection for a person on the walkway surface from falling down. That arrangement so-to-speak forms a working pulpit to afford a person on the walkway surface protection against falling down in all directions.

In an aspect of the invention the motion device is secured in the closed condition of the cover by means of an arresting device. That is advantageous as the cover can be secured by that arresting means and can be secured against accidental downward pivotal movement, that is to say opening, in particular when a ship on which the Magnus rotor is used is subject to a heavy swell. In addition each segment of the cover can be opened individually, that is to say pivoted downwardly, by means of that arresting arrangement. The arresting arrangement is advantageously accessible from the exterior and is to be quickly and easily operated without auxiliary means and tools, for example by a rotary movement through 90°.

BRIEF DESCRIPTION OF THE SEVERAL VIEWS OF THE DRAWINGS

Embodiments by way of example and advantages of the invention are described more fully hereinafter with reference to the following Figures.

DETAILED DESCRIPTION

Figure 1:
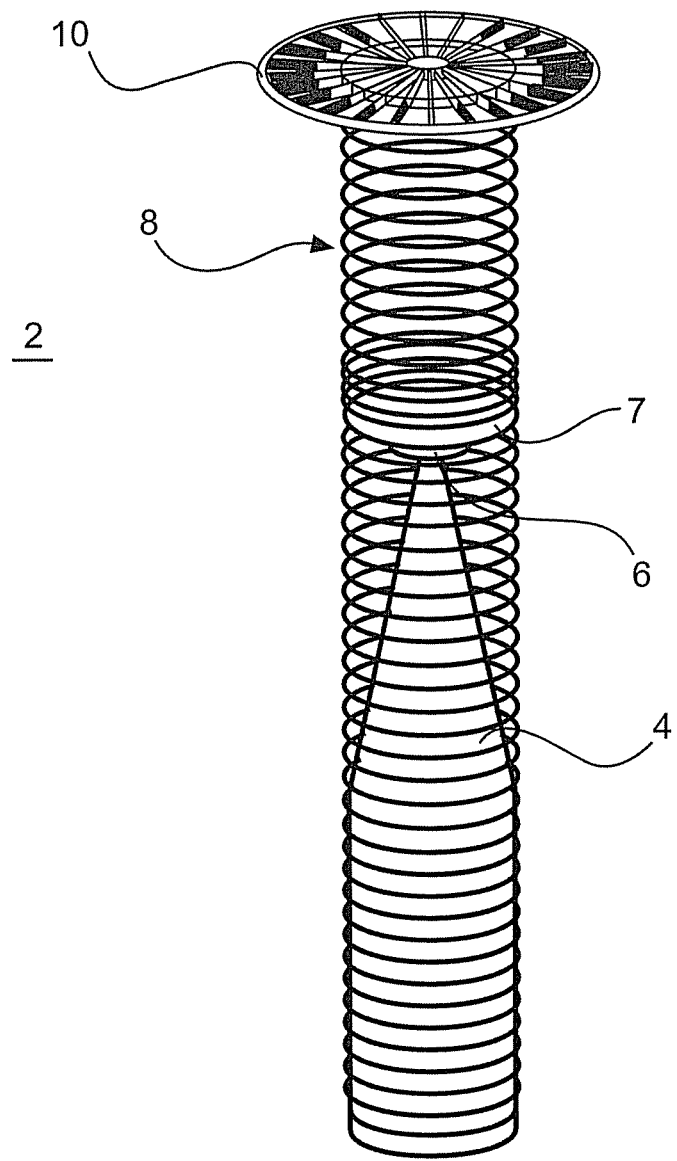
FIG. 1 shows a diagrammatic perspective view of a Magnus rotor of a first embodiment.

FIG. 1 shows a diagrammatic perspective view of a Magnus rotor 2 in accordance with a first embodiment. The Magnus rotor 2 has a carrier 4 in the form of a lower stationary part. The carrier 4 is mounted on an underlying structure which can be a base plate or the deck of a ship (not shown, see FIGS. 9 and 10). The rotor 8 is arranged around the carrier 4. The rotor 8 is preferably in the form of a cylinder and is so spaced from the carrier 4 that the rotor 8 can rotate around the carrier 4, around the common center line. The carrier 4 and the Magnus rotor 2 itself are also preferably cylindrical. In its interior the rotor 8 has a hub 7, by way of which the rotor 8 is connected to the carrier 4 by way of a bearing 6. In this case the bearing 6 supports the rotor 8 by the hub 7. In addition at an upper end the rotor 8 has a disc-shaped end plate 10 which horizontally closes off the internal space in the rotor 8. All the aforementioned components of the Magnus rotor 2 are in this case rotationally symmetrical with respect to the center line, that is to say the axis of rotation, of the Magnus rotor 2.

Figure 2:
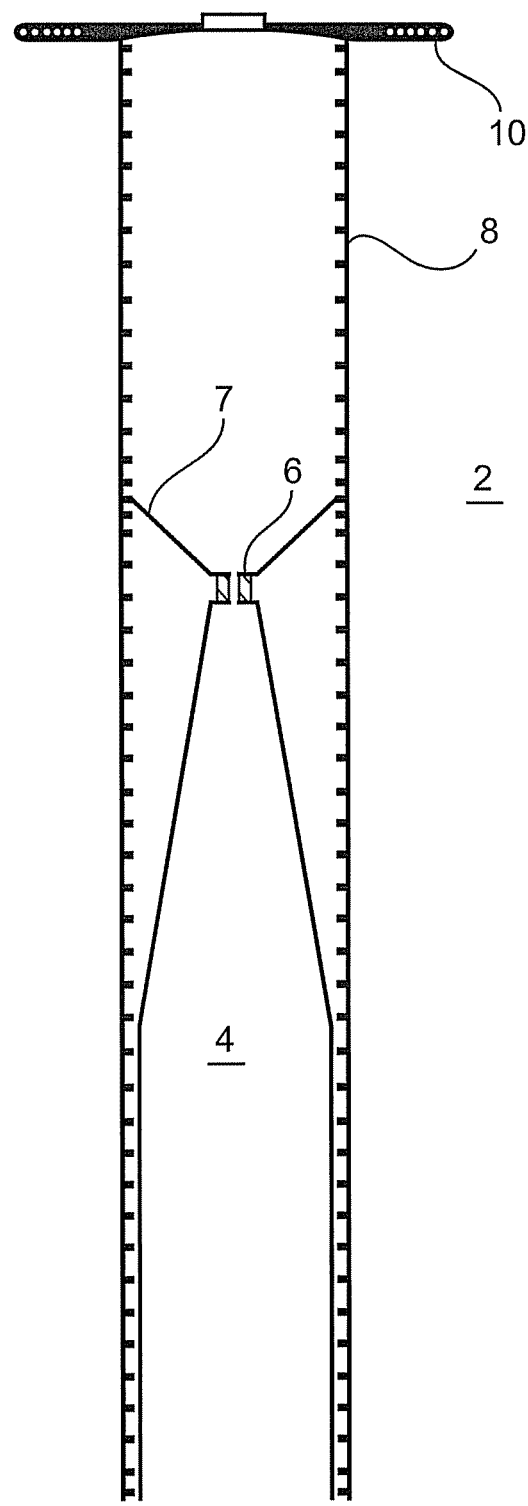
FIG. 2 shows a diagrammatic side view of a Magnus rotor of a first embodiment.

FIG. 2 shows a diagrammatic side view of a Magnus rotor 2 in accordance with the first embodiment. In this case FIG. 2 shows the components of the Magnus rotor 2 of FIG. 1.

Figure 3:
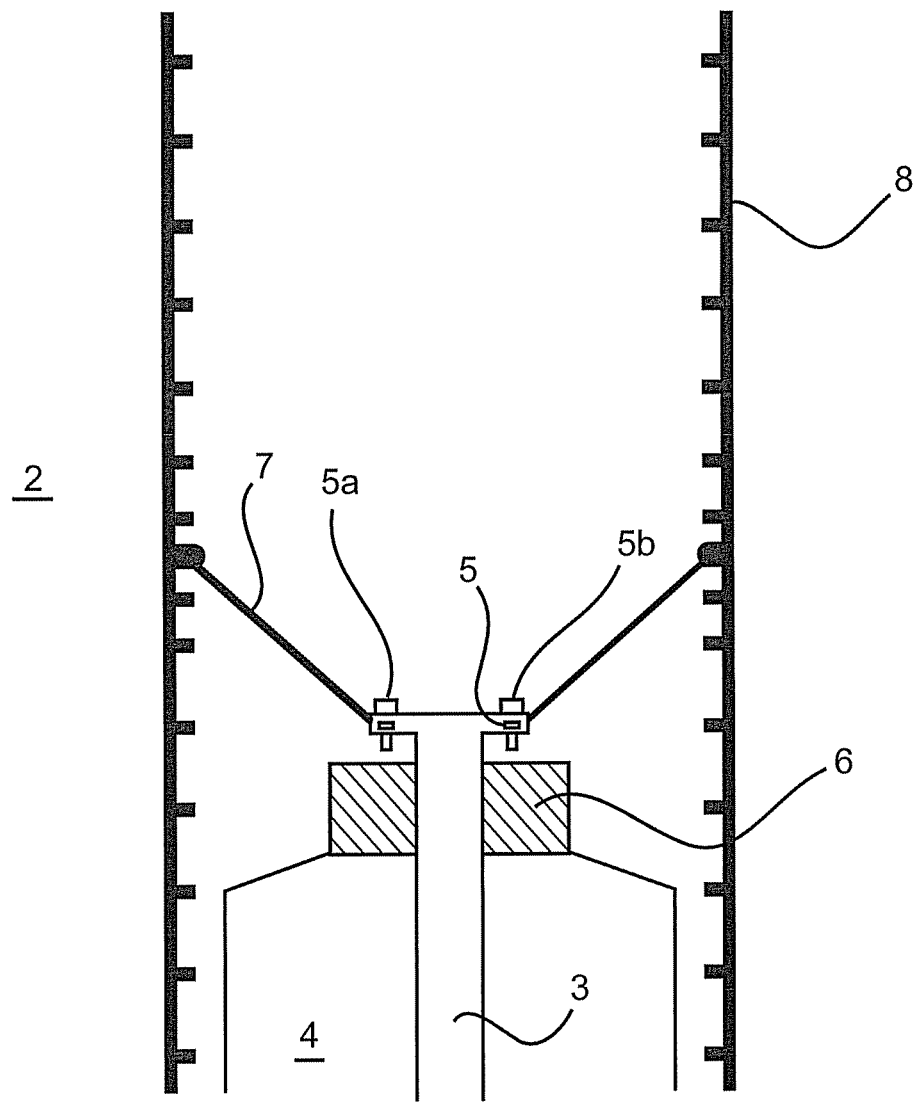
FIG. 3 shows a diagrammatic side detail view of a Magnus rotor of the first embodiment.

FIG. 3 shows a diagrammatic side view in detail of a Magnus rotor 2 according to the first embodiment. This Figure shows in detail the central part of the Magnus rotor 2, in which the rotor 8 and the carrier 4 are connected together by way of the bearing 6. In this view a shaft 3 projects upwardly from the internal space in the carrier 4, on the center line of the Magnus rotor 2. In this arrangement the shaft 3 is held by the bearing 6 in a vertical direction and is so supported in the horizontal direction that the shaft 3 can rotate about the center line of the Magnus rotor 2. In this embodiment, at its upper end, the shaft 3 terminates above the bearing 6 with a flange 5 which in this embodiment is of a larger radial diameter than the shaft 3 and the bearing 6. The hub 7 is fixed to the flange 5 for example by screws or bolts 5*a*, 5*b*. In that respect it is advantageous for that connection between the flange 5 and the hub 7 to be made releasable, instead of for example a weld, to facilitate assembly and also to permit those components to be separated for example for repair or maintenance. In addition, not all connecting locations between the flange 5 and the hub 7 may be provided in such a way that they are accessible for welding.

Figure 4:
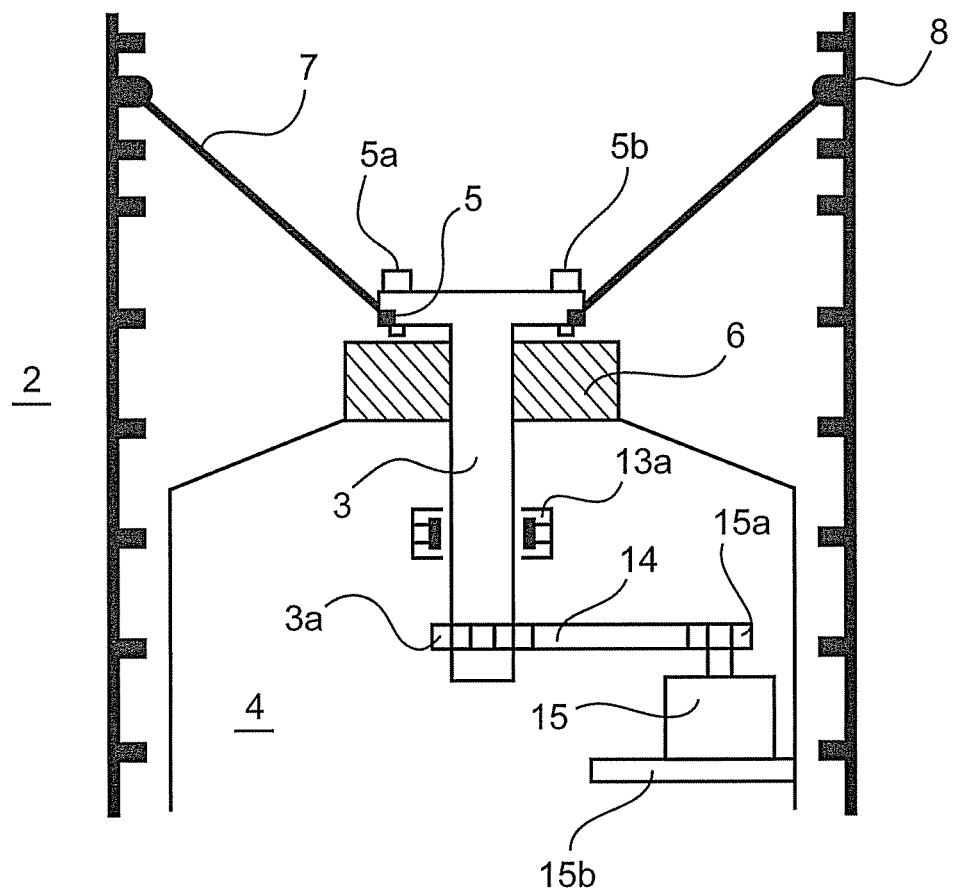
FIG. 4 shows a further diagrammatic side detail view of a Magnus rotor of the first embodiment.

FIG. 4 shows a further diagrammatic side view in detail of a Magnus rotor 2 according to the first embodiment. Besides the components described with reference to FIG. 3 FIG. 4 shows further details of the drive according to the invention. Thus provided in the interior of the carrier 4 is a brake 13*a* which can act on the shaft 3, that is to say which can decelerate the shaft 3 and/or stop it. That can be effected for example by a brake 13*a* which acts radially on the shaft 3 by means of brake shoes or pads or the like. In addition, arranged in the interior of the carrier 4 is a motor 15 which for example can be an electric motor. The motor 15 has a drive gear 15*a* which is connected by way of a toothed belt 14*a* to a driven gear 3*a* of the shaft 3. Rotation of the motor 15 is transmitted to the shaft 3 by way of the two gears 15*a* and 3*a* and the toothed belt 14. The shaft 3 is mounted in the bearing 6 rotatably about the center line of the Magnus rotor 2 so that it rotates about that center line, due to the drive from the motor 15. As the shaft 3 is fixedly and rigidly connected to the rotor 8 above the bearing 6 by way of the flange 5 and the hub 7 the rotation of the shaft 3 is transmitted to the rotor 8.

FIG. 4 further shows a tensioning device 15*b* for changing the toothed belt 14. Thus the motor 15 can be moved radially towards the center line of the Magnus rotor 2 by means of the tensioning device 15*b*, also referred to as a movable member, to remove the toothed belt 14. In that way the tension in the toothed belt is slackened. In that slackened condition the toothed belt 14 can be removed from the gears 15*a* and 3*a* and a new toothed belt 14 can be fitted thereon. As, in that loose condition, transmission of force by way of the toothed belt 14 between the gears 15*a* and 3*a* is not possible, the motor 15 is now moved radially away from the center line of the Magnus rotor 2 by the tensioning device 15*b*. That tensions the toothed belt 14. In that case the motor 15 is to be moved radially away from the center line of the Magnus rotor 2 to such an extent, and the toothed belt 14 is to be correspondingly tensioned to such a degree, that on the one hand transmission of force from the drive gear 15*a* to the driven gear 3*a* is reliably possible, that is to say the toothed belt 14 reliably engages into the teeth of the gears 15*a* and 15*b* and does not slip, while on the other hand the toothed belt 14 is to be tensioned to such a degree that it does not tear and also the gears 15*a* and 3*a* are not to be excessively heavily loaded, that is to say no inadmissible forces are to act thereon in the radial direction, due to the toothed belt 14, which could cause deformation of or damage to the gears 15*a* and 3*a*.

Figure 5:
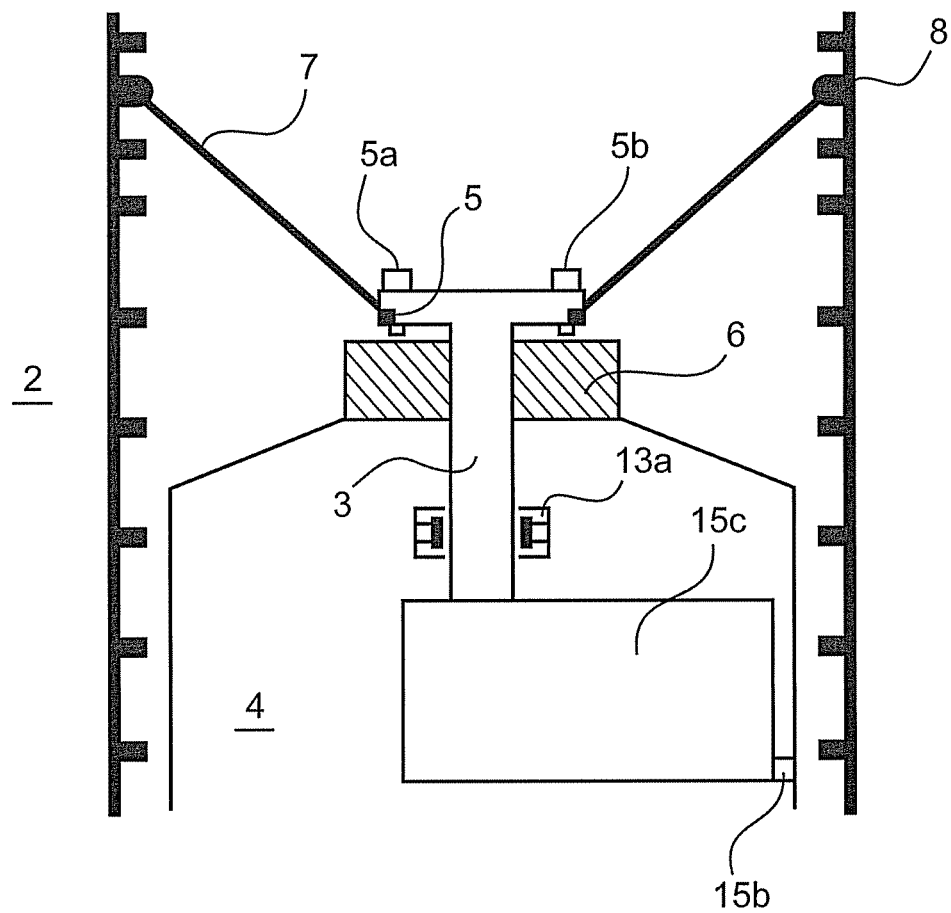
FIG. 5 shows a further diagrammatic side detail view of a Magnus rotor of the first embodiment.

FIG. 5 shows a further diagrammatic side detail view of a Magnus rotor 2 of the first embodiment. This view shows substantially the components of FIG. 4. In this case the motor 15, the toothed belt 14, the gears 15*a* and 3*a* and the major part of the tensioning device 15 are concealed under a cover 15*c*. The brake 13*a* is also concealed under the cover 15*c* although in this view the brake 13*a* is provided outside the cover 15*c*. At its top side the cover 15*c* has an opening, through which the shaft 3 can pass. The cover 15*c* also has radially outwardly an opening through which the tensioning device 15*b* can pass in order there for example to be connected to the carrier 4. In this case the cover 15*c* serves to protect the operating personnel who may be in the interior of the carrier 4 in order to avoid the personnel being open to injury by the movable components of the drive, that is to say the motor 15, the gears 15*a* and 3*a*, the toothed belt 14 and the shaft 3. In addition the cover 15*c* protects the drive from dirt and also loose parts which could drop into the drive and there get between the movable components and accordingly damage them.

Figure 6:
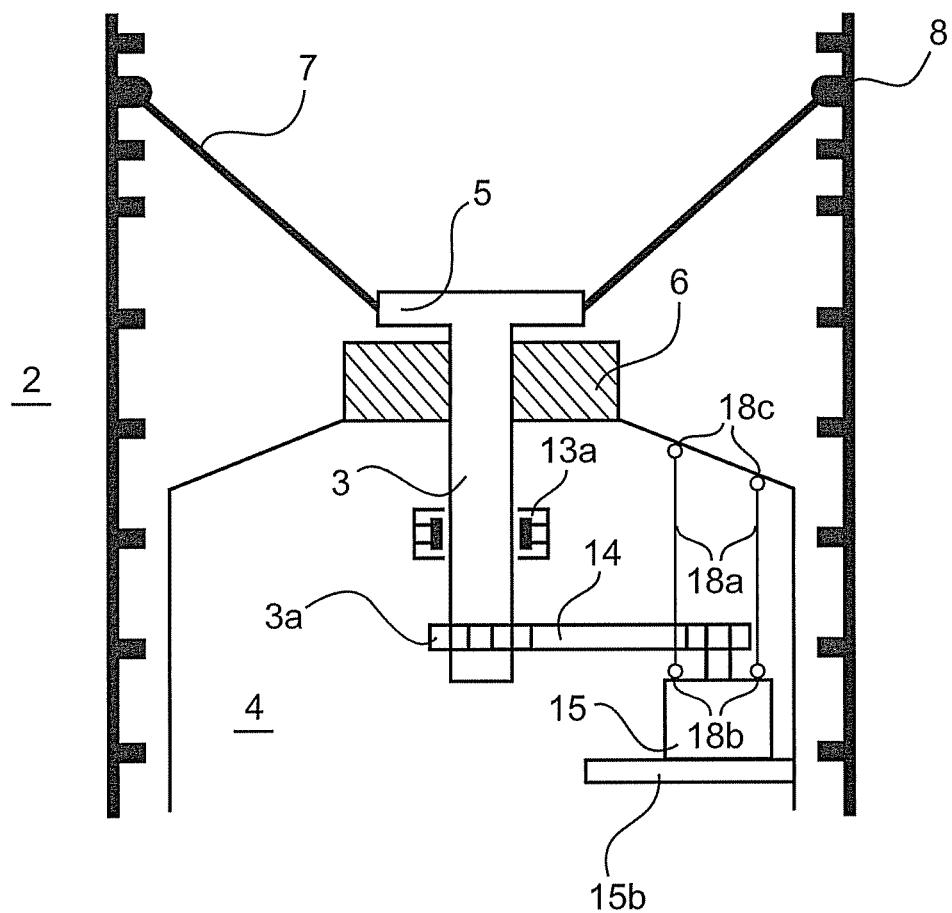
FIG. 6 shows a further diagrammatic side detail view of a Magnus rotor of the first embodiment.

FIG. 6 shows a further diagrammatic side view in detail of a Magnus rotor 2 of the first embodiment. This Figure shows the components of the Magnus rotor 2 illustrated in FIG. 4, that is to say the drive without the cover 15*c* in FIG. 5. Also shown in this Figure are eyes 18*b* provided at the top side of the motor 15. Eyes 18*c* are provided at the inside of the carrier 4. Instead of eyes it is also possible to provide other fixing points such as hooks, lugs, angle members, holes or the like. Provided between the motor eyes 18*b* and the carrier eyes 18*c* are cables 18*a* which are tensioned in such a way that on the one hand they cannot sag down and swing around, while on the other hand they also do not carry any forces, that is to say forces due to the weight of the motor 15 and the components connected thereto such as for example the tensioning device 15*b*, the drive gear 15*a* or the toothed belt 14. Those cables 18*a* or comparable fixing means serve in that case to secure the motor 15 and the components connected thereto, in the event that the fixing of the motor 15 or the tensioning device 15*b* should come loose, for example if the rotary movements of the motor 15, the toothed belt 14, the shaft 3 and the rotor 8 in the Magnus rotor 2 should produce such oscillations and vibrations that as a result the screws or similar fixing means with which the motor 15 is fixed to the tensioning device 15*b* or with which the tensioning device 15*b* is fixed to the carrier 4, should come loose. In that respect the cables 18*c* are to be tensioned in such a fashion that they do not carry any impulse-like application of force due to the motor 15 dropping down as they could tear due to a sudden loading of that kind, rather than by a constantly applied force due to the weight of the motor 15.

Figure 7:
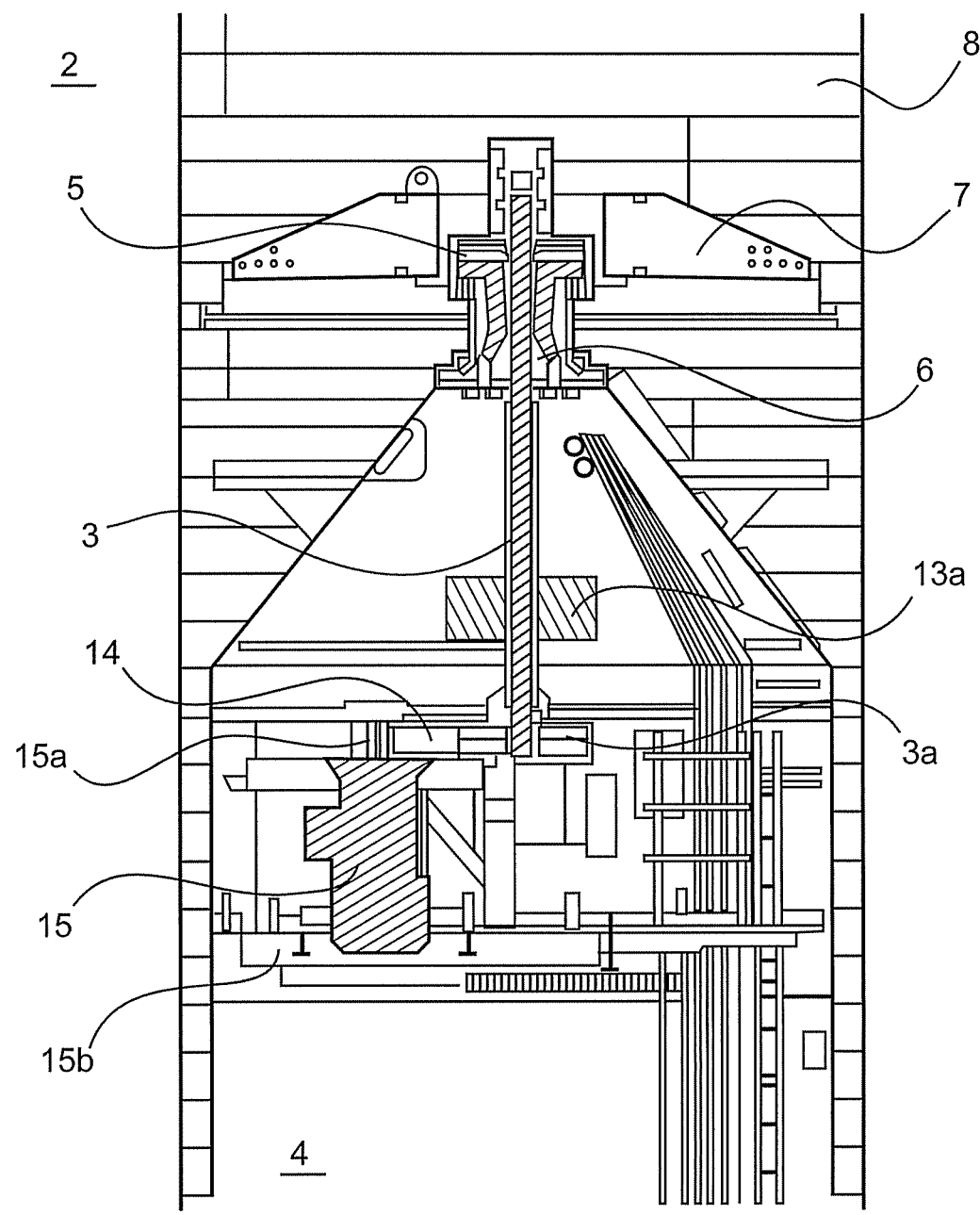
FIG. 7 shows a side detail view of a Magnus rotor of the first embodiment.

FIG. 7 shows a side detail view of a Magnus rotor 2 according to the first embodiment. In this case the elements of previous FIGS. 1 to 6 are shown in detail without the cover 15*c*.

The motor 15 of the drive according to the invention of a Magnus rotor 2 is arranged in the interior of the carrier 4 and there drives a gear 15*a* for rotation thereof. The gear 15*a* is connected by way of a toothed belt 14 to a gear 3*a* arranged in the lower region of the shaft 3. Therefore the rotation of the motor 15 is transmitted by way of the drive gear 15*a* to the driven gear 3*a* of the motor 3, by way of the toothed belt 14, that is to say the motor 15 rotates the shaft 3. In that case the transmission ratio between the motor 15 and the shaft 3 can be predetermined by way of the ratio of the teeth of the gears 15*a* and 3*a*. In addition a transmission arrangement can also be provided at the driven side of the motor 15 to predetermine a transmission ratio from the motor 15 to the driven gear 15*a*.

The shaft 3 is passed through the bearing 6. In that arrangement the bearing 6 connects the stationary carrier 4 to the rotating rotor 8 driven by the shaft 3, in such a way that a part of the bearing 6 is rigidly and fixedly connected to the carrier 4 and the other part of the bearing 6 is rigidly and fixedly connected to the rotating shaft 3. In that arrangement the bearing 6 can be provided in the form of rolling, ball or roller bearings or the like. In that case the bearing 6 is of such a configuration that the shaft 3 is held in opposition to the force of gravity, against the force due to its weight and that of the components connected to the shaft 3 such as the flange 5, the hub 7 and the rotor 8. In addition the radially acting forces occurring during rotation of the shaft 3 are carried by the bearing 6. The shaft 3 is mounted rotatably about the center line of the Magnus rotor 2, that is to say the shaft 3 can rotate about the center line of the Magnus rotor 2. In that case the center line of the Magnus rotor 2 forms the axis of symmetry thereof and thus also of the shaft 3, the carrier 4, the flange 5, the bearing 6, the hub 7 and the rotor 8. Provided around the shaft 3 is the brake 13*a* connected to the carrier 4 to decelerate the relative movement of the rotating parts, that is to say shaft 3, carrier 4, flange 5, bearing 6, hub 7 and rotor 8, around the carrier 4, or to prevent such relative rotary movement by stopping them.

Above the bearing 6 the shaft 3 is connected to a flange 5 which can be in the form of a portion of the shaft 3 or can be connected as a separate element to the shaft 3. The flange 5 is connected to the hub 7 which in turn is connected to the rotor 8. In that arrangement the components shaft 3, flange 5, hub 7 and rotor 8 are fixedly and rigidly connected together and jointly represent the rotating part of the Magnus rotor 2, driven in rotation by the motor 15 by means of the toothed belt 14, that is to say which in operation rotates about the carrier 4.

Figure 8:
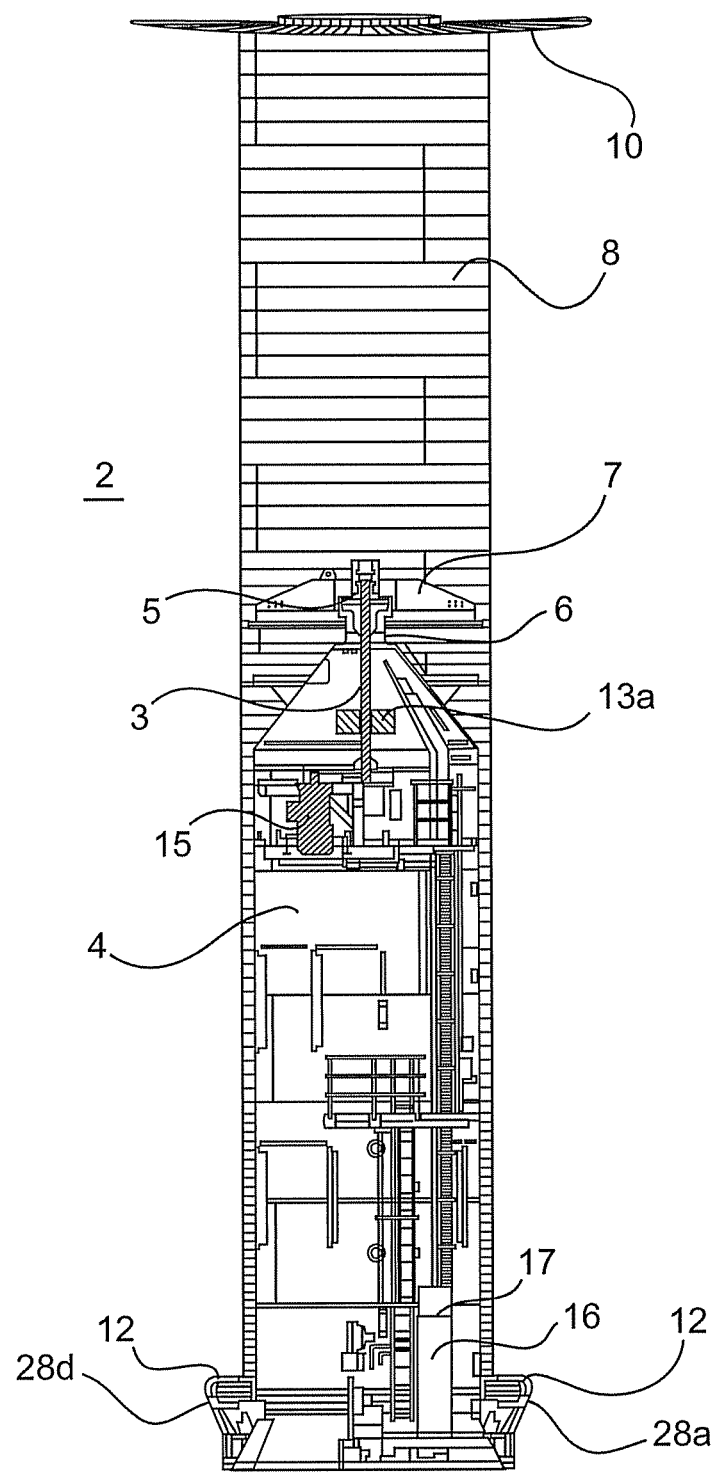
FIG. 8 shows a side detail view of a Magnus rotor of the first embodiment.

FIG. 8 shows a side detailed view of a Magnus rotor 2 according to the first embodiment. Besides the components shown in foregoing FIGS. 1 to 7, shown in the interior of the carrier 4 in its lower region are a control 16 and an inverter 17. The control 16 can control the inverter 17, the motor 15 and further components of the Magnus rotor 2. The inverter 17 can serve to supply the motor 15 with electrical energy. In this arrangement the motor 15, the control 16 and the inverter 17 are provided in the interior of the carrier 4 to be removed jointly therewith and replaced by another Magnus rotor 2, if repairs or maintenance operations should be required on the Magnus rotor 2 or one of its components. To be able to quickly and easily remove the Magnus rotor 2 as a modular component, the connections for the feed and/or discharge of electric current, oil, hydraulic fluid, water, compressed air or the like to the motor 15, the control 16 and the inverter 17 are provided in such a way that they are quick and easy to separate and the Magnus rotor 2 can be lifted by means of a crane from an underlying structure 20 (not shown, see FIGS. 9 and 10) like the deck of a ship or a base plate.

In addition FIG. 8 shows guide rollers 12 and covers 28*a* and 28*d*. The covers 28*a* and 28*d* cover the lower peripheral edge of the rotor 8 and the guide rollers 12 and thus on the one hand prevent foreign bodies from passing into the drive or the guide rollers 12, while on the other hand ensuring that operating personnel cannot suffer injury at exposed rotating parts.

Figure 9:
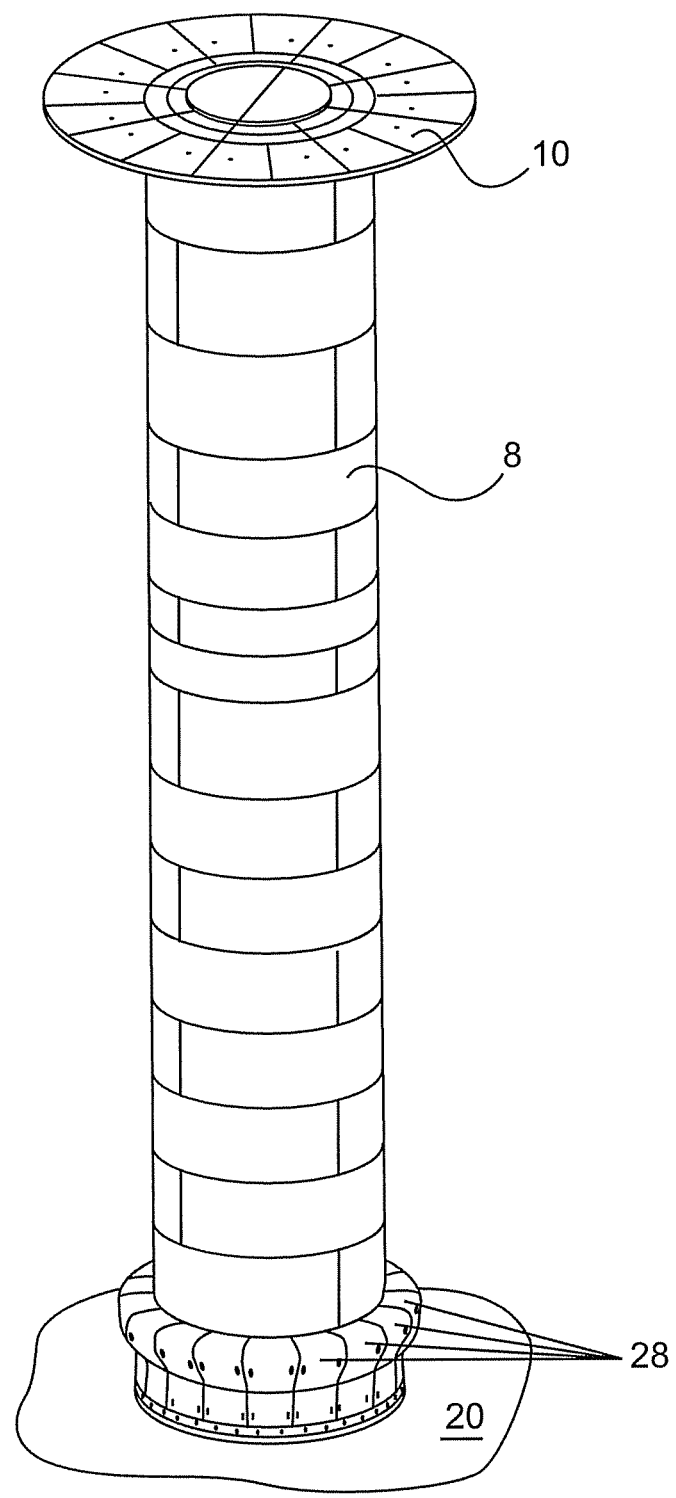
FIG. 9 shows a diagrammatic perspective view of a Magnus rotor.

FIG. 9 shows a diagrammatic perspective view of a Magnus rotor 2. In this case the Magnus rotor 2 is shown with a closed surface so that the carrier 4 is not illustrated. In this view the covers 28 are in a closed position, that is to say in an upwardly pivoted position so that the covers 28 cover the guide rollers 12. In that respect, the Figure shows a Magnus rotor 2 which is fixed on the underlying structure 20 like the deck of a ship or a base plate.

Figure 10:
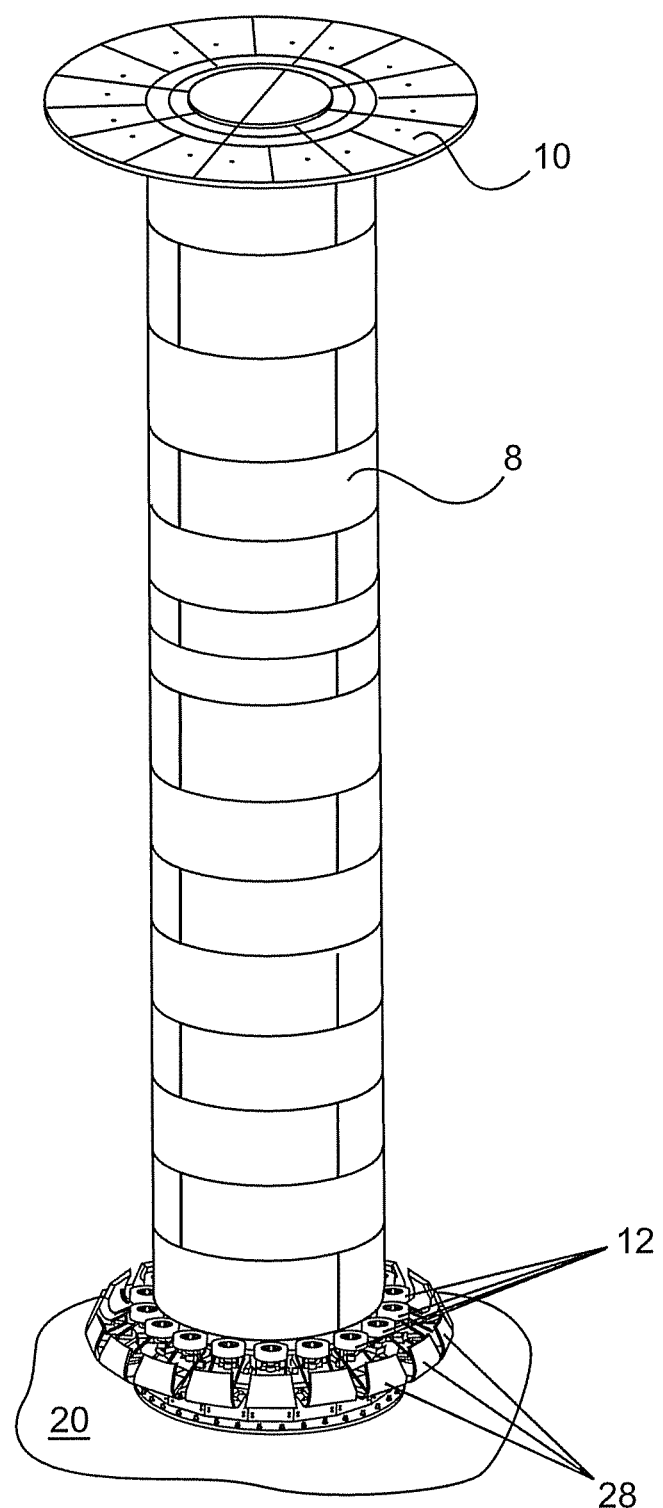
FIG. 10 shows a diagrammatic perspective view of a Magnus rotor.

FIG. 10 shows a diagrammatic perspective view of a Magnus rotor 2 with the covers 28 in the open condition, that is to say pivoted downwardly, exposing a view on to the guide rollers 12 disposed thereunderneath. Shown here is a Magnus rotor 2 which is fixed on the underlying structure 20 like the deck of a ship or a base plate.

Figure 11:
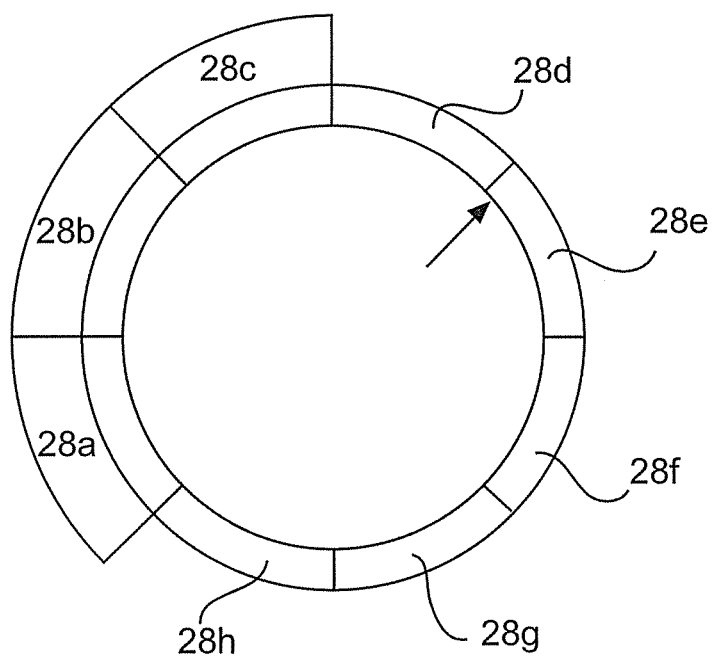
FIG. 11 shows a diagrammatic simplified view of cover segments of the guide rollers of a Magnus rotor.

FIG. 11 shows a simplified diagrammatic view of cover segments 28*a* to 28*h* of the guide rollers 12 of a Magnus rotor 2 as a plan view without the end plate 10 and without showing the carrier 4 and the bearing 6. Covers 28*a* to 28*h* are arranged around the outside periphery of the Magnus rotor 2. In this case the covers 28*a*, 28*b* and 28*c* are covers, below which the guide rollers 12 are arranged, while the covers 28*d* to 28*h* cover the guide rollers 12. Due to the segmenting it is not necessary for the entire cover to be removed every time to gain access to individual parts of the drive and guide system.

Figure 12:
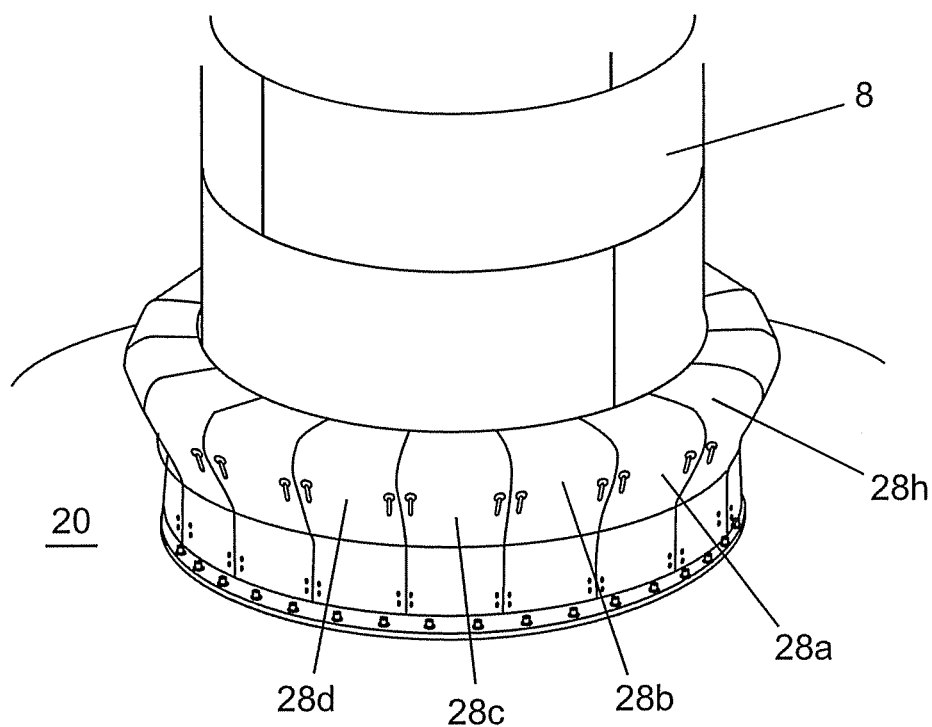
FIG. 12 shows a view of a Magnus rotor whose cover segments of the guide rollers are closed.

FIG. 12 shows a view of a Magnus rotor 2 whose cover segments 28*a* to 28*h* for the guide rollers 12 are closed. This shows a Magnus rotor 2 fixed on an underlying structure 20 like the deck of a ship or a base plate.

Figure 13:
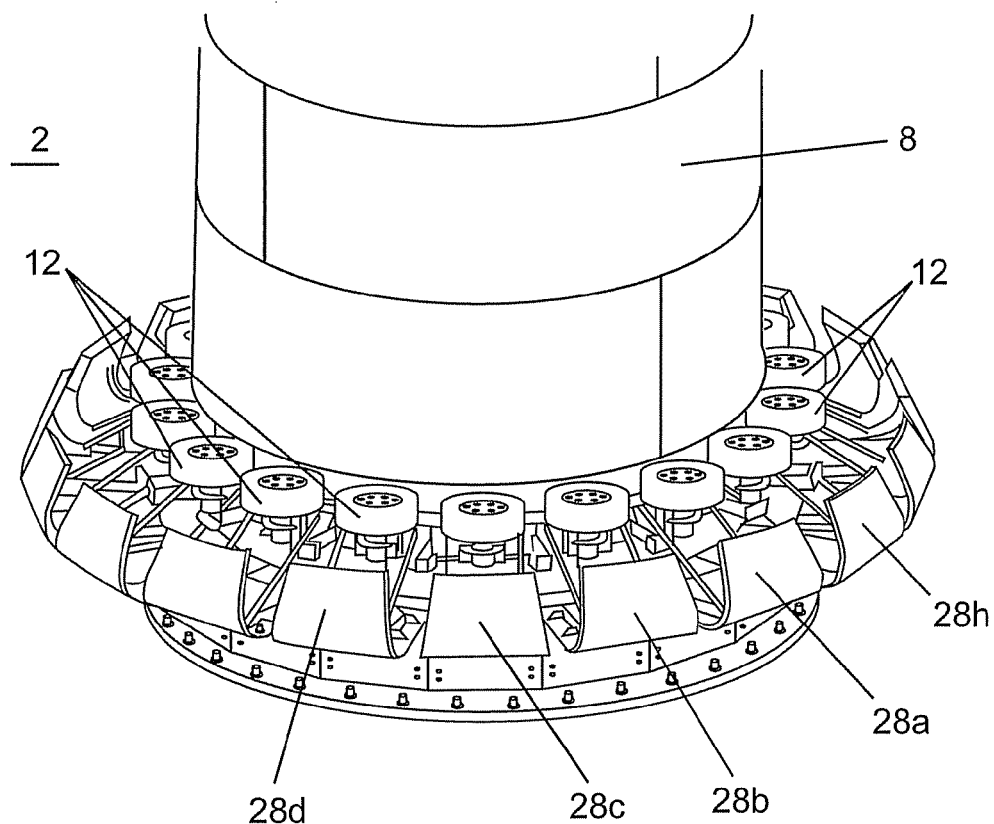
FIG. 13 shows a view of a Magnus rotor whose cover segments of the guide rollers are partially opened.

FIG. 13 shows a view of a Magnus rotor 2 whose cover segments 28*a* to 28*h* of the guide rollers are partially opened. In this case the cover segments 28*a* to 28*c* are opened, that is to say pivoted downwardly in the direction of the underlying structure 20 like the deck of a ship. It is possible to see the guide rollers 12, wherein each guide roller 12 can be covered under a respective one of the cover segments 28*a* to 28*h*.

Figure 14:
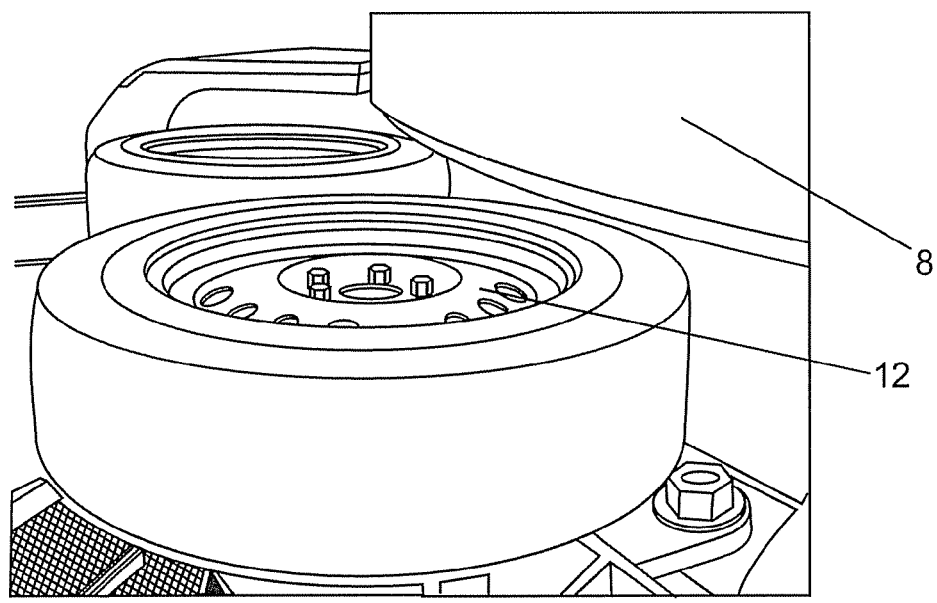
FIG. 14 shows a view of guide rollers of a Magnus rotor.

FIG. 14 shows a view of guide rollers 12 of a Magnus rotor 2. Tires of motor vehicles can be used as the guide rollers 12. In this case profile-less tires are to be used to reduce the generation of noise when the Magnus rotor 2 is moving. The guide rollers 12 are mounted on an axis of rotation oriented parallel to the axis of rotation of the Magnus rotor. They are provided at a lower peripheral edge of the rotor 8 of the Magnus rotor 2. The guide rollers 12 are distributed over the entire periphery of the Magnus rotor 2 and bear in play-free relationship thereagainst. Even if therefore a tilting moment should occur for example due to a gust of wind and the fact that the bearing is arranged relatively high (see for example FIG. 2), that cannot lead to a swinging movement of the Magnus rotor 2 as the guide rollers 12 reliably prevent that. This ensures that the Magnus rotor 2 always performs a precise rotary movement.

A substantial advantage of this guide system lies in its good accessibility and its simple structure. In that respect the structure of the guide rollers 12, due to the use of motor vehicle tires, corresponds to the structure of a wheel suspension in a motor vehicle. Therefore the manner in which the guide rollers 12 are mounted is familiar and known, for which reason replacement of the guide rollers can be effected very easily and without requiring special training or tools for same, as it is only necessary to have the same tool as when changing a tire of a motor vehicle.

It is also advantageous that the guide rollers 12 are disposed outside the Magnus rotor 2. Thus, no parts which wear or can be damaged are disposed on the Magnus rotor 2. Replacement of guide rollers 12 is also possible without any problem as the guide rollers 12 are accessible from the exterior. Maintenance is also simplified as it is possible to carry out a visual check even in ongoing operation as the operator does not have to pass into the interior of the carrier 4 of the Magnus rotor 2. In that way it is possible to remove faults with a low level of complication and expenditure.

Figure 15:
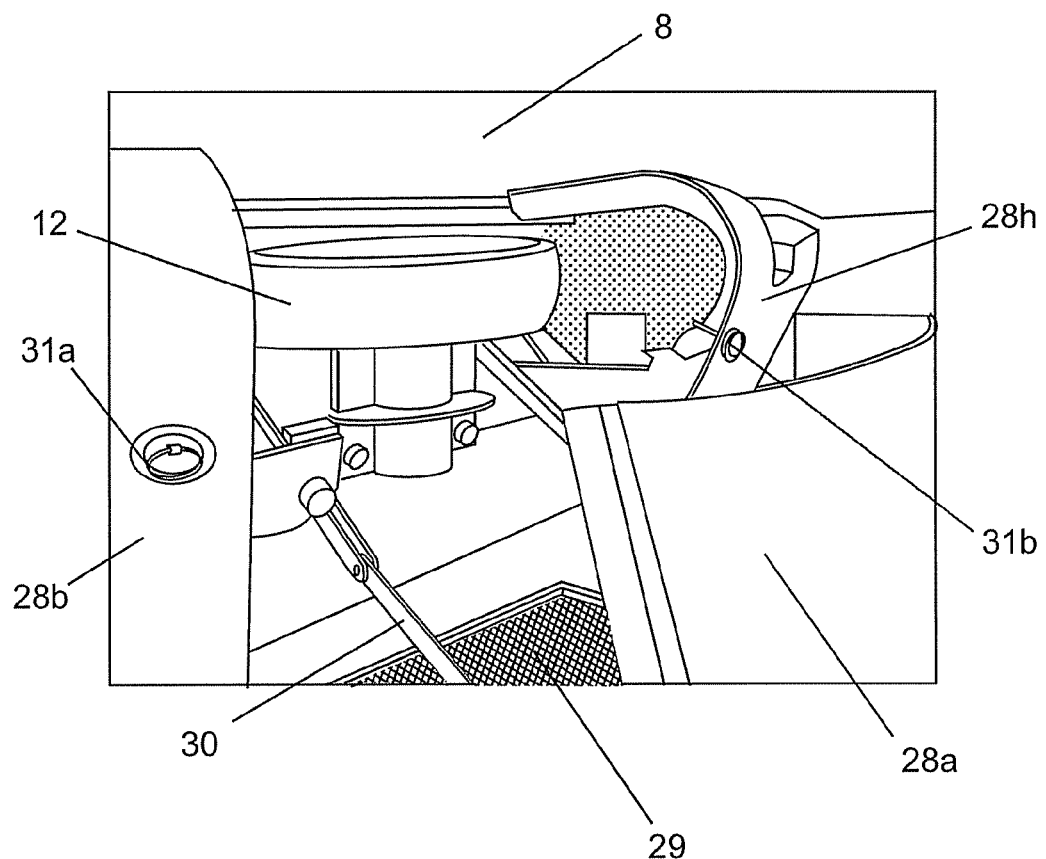
FIG. 15 shows a view of a guide roller of a Magnus rotor whose cover segment is opened.

FIG. 15 shows a view of a guide roller 12 of a Magnus rotor 2 whose cover segment 28a is opened. The adjacent cover segments 28b and 28h are closed. In this case the cover segment 28a is pivoted downwardly so that a walkway surface 29 beneath the guide roller 12 is visible. That walkway surface is provided beneath the guide roller 12 and is also covered by the cover segment 28a when the latter is pivoted up over the guide roller 12 and closed. Rods 30 are provided at both sides of the cover segment 28a for pivoting the cover segment 28a up and down. The cover segment 28a is secured in the upwardly pivoted position by means of two levers 31a and 31b.

Figure 16:
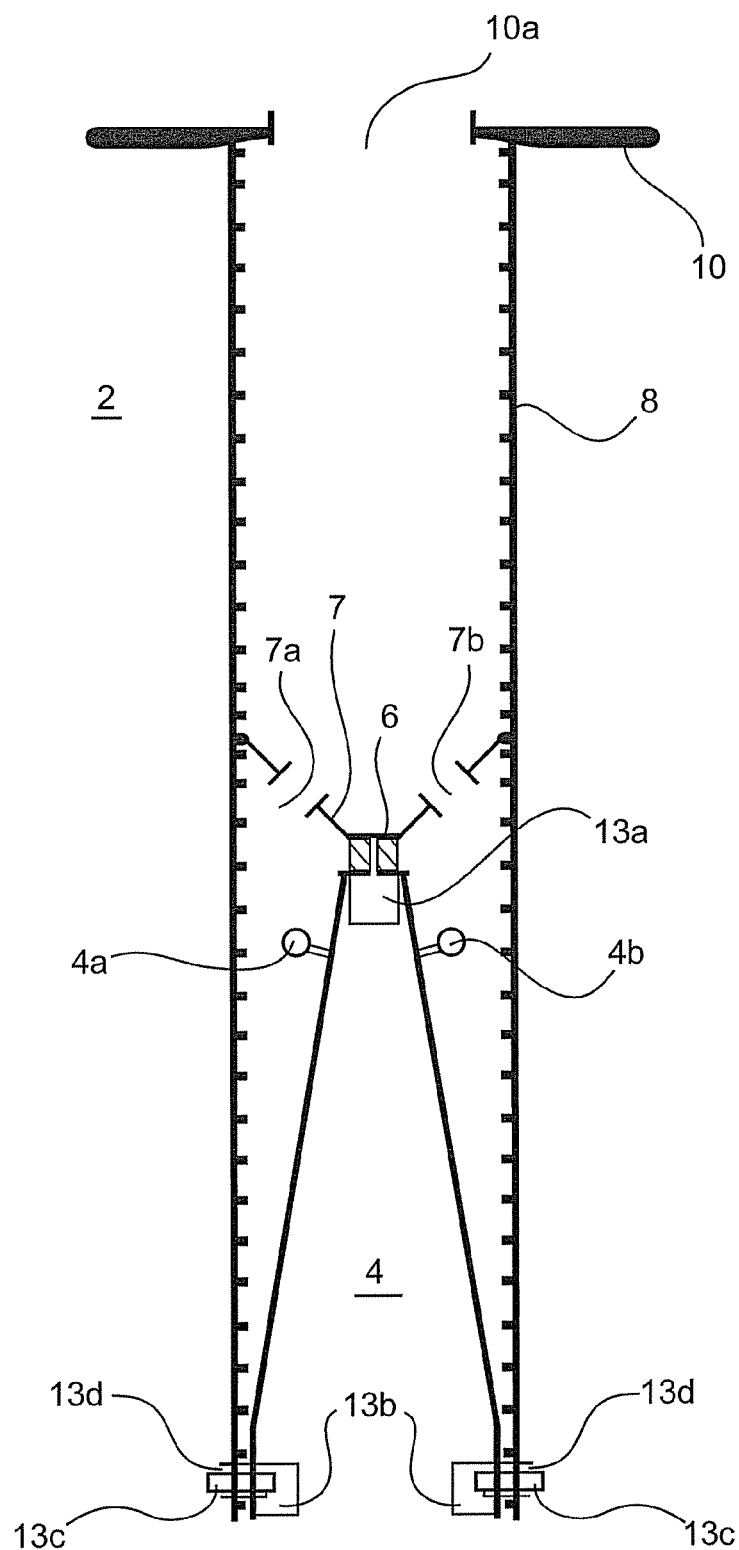
FIG. 16 shows a simplified diagrammatic side view of the upper part of a Magnus rotor.

FIG. 16 shows a diagrammatic simplified side view of the upper part of a Magnus rotor 2. The Figure shows a brake 13a or a securing device 13b which are both provided as alternative possible options or also jointly, to reliably prevent a relative movement as between the stationary carrier 4 and the rotor 8. In this arrangement the brake 13a can act on the motor 15 or the shaft 3. The securing device 13b has a securing element 13c which can be a pin 13c or the like which is passed radially through an opening 13d in the rotor 8.

Provided in the end plate 10 is an opening 10a connecting the internal space in the rotor 8 above the bearing 6 to the area surrounding the Magnus rotor 2. That opening 10a is adapted to be closable in order generally to be closed, in particular in operation of the Magnus rotor 2. The opening 10a is therefore opened only when the rotor 8 is in a stationary condition in which the rotor 8 is secured by the brake 13a or the securing device 13b, while otherwise it is closed, that is to say screwed fast, in such a way that unintentional opening of the opening 10a, in particular due to centrifugal forces occurring during operation of the Magnus rotor 2, is reliably avoided. Alternatively it is also possible to provide two openings 10a and 10b, as shown hereinafter in FIG. 17.

In addition two openings 7a and 7b are provided in the flange 7. Like the opening 10a in the end plate 10, those openings can also be opened. That is also intended only in a stationary secured condition of the rotor 8 and those openings 7a and 7b are also secured to prevent accidental opening due to centrifugal forces and other circumstances.

In addition the inwardly disposed carrier 4 has two fixing points 4a and 4b provided at the outside wall of the inwardly disposed carrier 4. In this case those fixing points 4a and 4b can be pins, eyes, lugs, hooks or the like to fix thereto or through them fixing means such as for example a cable as such or a cable having a hook, a shackle, a loop or the like.

The openings 7a and 7b and the fixing points 4a and 4b are all arranged approximately at the same spacing, that is to say at substantially the same radius relative to the center line, that is to say the axis of rotation, of the Magnus rotor 2. The opening 10a is formed radially around that center line. In addition the openings 7a and 7b, the opening 10a and the fixing points 4a and 4b are respectively disposed approximately in the same horizontal plane, that is to say they are respectively disposed in pair-wise relationship at substantially the same vertical spacing relative to the end plate 10, the bearing 6 or also the base plate 20. In that horizontal plane, the openings 7a and 7b, and the fixing points 4a and 4b respectively, are arranged displaced approximately through 180° relative to each other, that is to say they are respectively disposed directly in opposite paired relationship approximately with respect to the center line, that is to say the axis of rotation, of the Magnus rotor 2. The opening 10a is of such a configuration that its radius around the center line approximately corresponds to the largest spacing of the outer edge of the openings 7a and 7b or is selected to be of such a size that the radius of the opening 10a around the center line is greater than the spacing of the fixing points 4a and 4b from the center line in the radial direction.

In this case the two openings 7a and 7b are arranged directly beneath the opening 10a. Displacement of the openings 7a and 7b with respect to the opening 10a is not possible as the openings 7a and 7b and the opening 10a are provided on component parts of the rotor 8, which are rigidly connected to each other, that is to say which cannot be displaced or moved relative to each other. In contrast the fixing points 4a and 4b are provided on the inwardly disposed carrier 4 as the stationary part of the Magnus rotor 2 and the openings 7a and 7b and the opening 10a are provided on the rotor 8 as the movable part of the Magnus rotor 2. Therefore the movable rotor 8 is to be moved into a given position with respect to the stationary carrier 4 in order to provide that the fixing points 4a and 4b are disposed in a vertical direction directly beneath the openings 7a and 7b and the opening 10a of the rotor 8.

Figure 19:
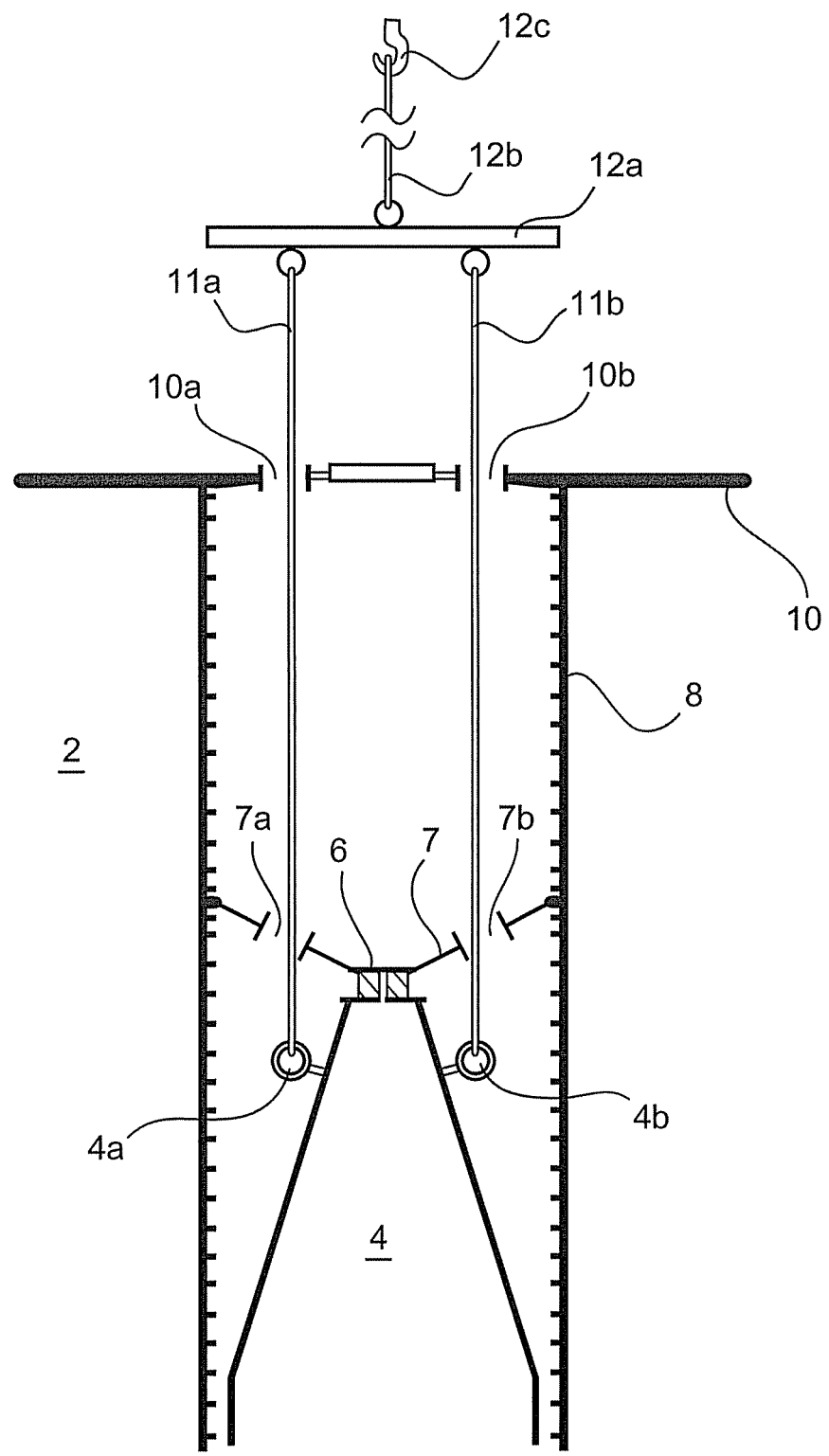
FIG. 19 shows a further simplified diagrammatic side view of the upper part of a Magnus rotor.

If, instead of an opening 10a as shown in FIG. 16, there are two openings 10a and 10b as shown in FIG. 19, they are to be so provided that they assume suitable positions and orientations and are of suitable dimensions, in relation to the openings 7a and 7b and the fixing elements 4a and 4b.

Figure 17:
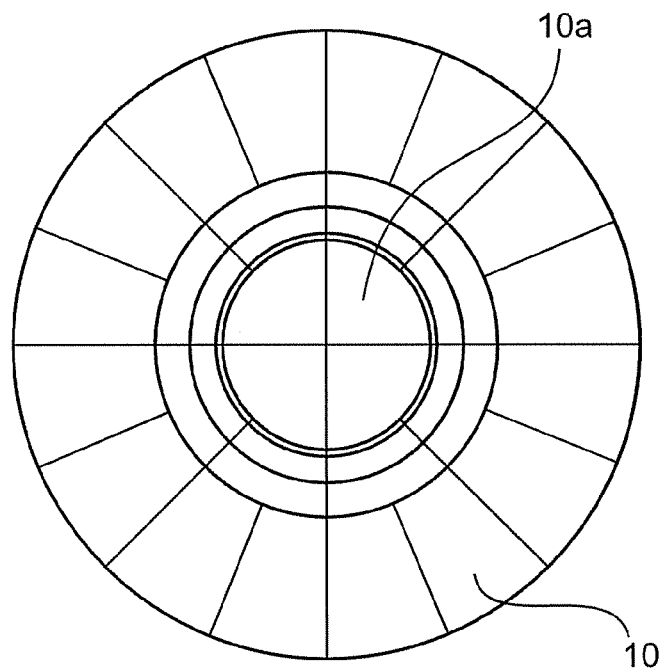
FIG. 17 shows a detailed diagrammatic view of a Magnus rotor from above.

FIG. 17 shows a detailed diagrammatic view of a Magnus rotor 2 from above. This view shows the end plate 10 and the opening 10a therein, the opening 10a being closed in this view.

Figure 18:
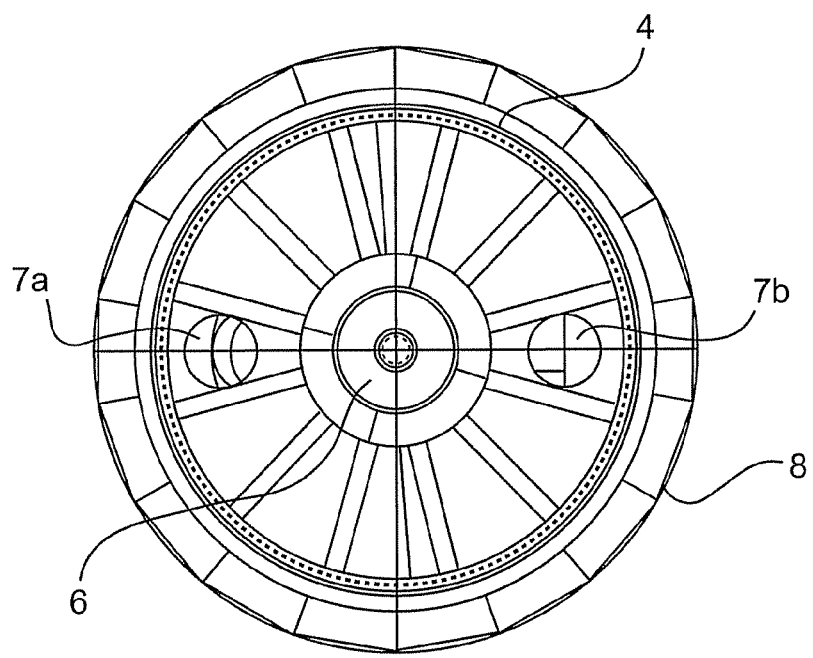
FIG. 18 shows a detailed diagrammatic view of the interior of a Magnus rotor from above.

FIG. 18 shows a detailed diagrammatic view of the interior of a Magnus rotor 2 from above. In this case the bearing 6 is arranged around the center line, that is to say around the axis of rotation, of the Magnus rotor 2. The stationary carrier 4 is arranged radially around that center line and beneath the bearing 6. Provided above the carrier 4 and radially therearound is the rotor 8 which is connected by means of the bearing 6 to the carrier 4 and which carries the rotor 8. The two openings 7a and 7b are provided in the flange 7 of the rotor 8, which connects the outer casing of the rotor 8 to the bearing 6.

FIG. 19 shows a further simplified diagrammatic side view of the upper part of the Magnus rotor 2. Instead of the one opening 10a shown in FIG. 16, this view shows two openings 10a and 10b. Two cables 11a and 11b are shown as fixing means, fixed to the fixing points 4a and 4b of the inwardly disposed carrier 4. The openings 7a and 7b in the flange 7 and the openings 10a and 10b in the end plate 10 are opened. The cables 11a and 11b are passed from the fixing points 4a and 4b through the openings 7a and 7b and further through the openings 10a and 10b into the external area around the Magnus rotor 2 where they are fixed for example by way of a transverse lifting beam 12a by means of a cable 12b to the hook 12c of a crane. In this case the cables 11a and 11b are tensioned between the fixing points 4a and 4b of the carrier 4 and the transverse lifting beam 12a of the crane, that is to say they are pulled vertically taut by a force in opposite relationship to the direction of the force of gravity.

In this condition shown in FIG. 19 the Magnus rotor 2 can be lifted by the cables 11a and 11b for example by a crane 12a, 12b, 12c of a port installation at which the ship equipped with Magnus rotors 2 has berthed, or also a crane 12a, 12b, 12c on board the actual ship. For that purpose it is necessary to release the connection between the carrier 4 of the Magnus rotor 2 and its underlying structure, that is to say the base plate 20 or the deck of the ship or the like. In that case the connection may be released only when the Magnus rotor 2 is reliably secured against tipping over, by the tensioned cables 11a and 11b.

In addition further connections between the inwardly disposed carrier 4 and the base plate 20 or the ship are to be disconnected before the Magnus rotor 2 can be lifted as a whole. Thus connections for the feed and/or discharge of electrical current, oil, hydraulic fluid, water, compressed air or the like to the motor 15, to the control 16 and to the inverter 17 are to be separated before the Magnus rotor 2 can be lifted from the base plate 20 or the deck of the ship by means of a crane 12a, 12b, 12c.

In order therefore to perform replacement of a Magnus rotor 2, for example for maintenance or repair on land, by another Magnus rotor 2, or to remove at least one Magnus rotor 2 for the above-mentioned purposes, the procedure to be adopted is as follows:

In a first step firstly the rotating Magnus rotor 2 is to be shut down, that is to say stopped. In that respect it is to be noted that the Magnus rotor stopped position is to be so selected that the fixing points 4a and 4b of the inwardly disposed carrier 4, in that position, are in a vertical direction directly beneath the openings 7a and 7b and the openings 10a and 10b of the rotor 8. In addition it is necessary to ensure for example by a brake 13a or a securing device 13b or the like that that stopped position is maintained and the rotor 8 can no longer move in relation to the stationary carrier 4.

That can be achieved by a brake 13a which is arranged for example on the stationary carrier 4 and which can act on the motor 15 or its shaft 3 to fix same. That can also be effected by a securing device 13b or a plurality of securing devices 13b provided in the stationary carrier 4 for example in such a way that the securing device or devices secure the carrier for example by means of a securing element 13c which can be passed by the securing means 13b from the stationary carrier 4 radially through an opening 13d in the rotor 8. In that case the shape and the dimensions of the securing element 13c, for example the diameter of a pin 13c, are to be adapted to the shape and the dimensions of the opening 13d in the rotor 8 in such a way that it is possible reliably to prevent a relative movement between the stationary carrier 4 and the movable rotor 8. That is important on the one hand because, when lifting the Magnus rotor 2, high forces act on the cables 11a and 11b and those forces can be transmitted to the component parts of the Magnus rotor 2 and can damage them, in particular deform them, in the event of accidental rotary movement of the movable rotor 8 in relation to the stationary carrier 4. The cables 11a and 11b can also be sheared off by a rotary movement and the lifted Magnus rotor 2 can be dropped. Furthermore, when fixing the cables 11a and 11b in the interior of the Magnus rotor 2, it is necessary for operators to be and to move in the interior thereof, in particular in regions between the movable rotor 8 and the stationary carrier 4, and for that reason a relative movement between the rotor 8 and the carrier 4 must be reliably excluded, for safety reasons.

In a second step the openings 7a and 7b and the openings 10a and 10b are opened and the component parts with which the openings 7a and 7b and openings 10a and 10b are closed, such as for example covers or flaps, are secured against accidental closure, that is to say falling shut. That securing effect is required to guarantee the safety of the operating personnel when performing working operations in the interior of the Magnus rotor 2. In addition, a cable 11a or 11b could be damaged by accidental closure of the openings or by the covers or flaps falling or sliding back, so that the cable in the tensioned condition could rip, whereby the entire load of the lifted Magnus rotor 2 would be carried on the remaining cable 11a or 11b. The second remaining cable 11a or 11b could also rip due to that overloading or also due to the impulse effect produced when the first cable 11a or 11b rips, so that as a result the Magnus rotor 2 could drop, and as a result could itself be severely damaged or even destroyed, and also the base plate 20 or the ship or the underlying structure of the port installation or the like could be damaged or destroyed. The crane 12a, 12b, 12c could also be damaged or destroyed by the impulse effect of the cable ripping. In addition, people could also be injured in that way. Equally, in the event that, if a first cable 11a or 11b tears away, the second cable 11a or 11b does not tear but carries the entire load, the fact of the first cable 11a or 11b breaking could cause a lateral oscillating movement of the lifted Magnus rotor 2, whereby the lifted, laterally swinging Magnus rotor 2 could also damage or destroy the base plate 20, the ship, the port installations, the lifting crane 12a, 12b, 12c or the like, or injure people in the area therearound.

In a third step a lifting device 12a, 2b, 12c with two cables 11a and 11b is lowered through the openings 7a and 7b and the openings 10a and 10b by a crane 12a, 12b, 12c to the fixing points 4a and 4b where it is securely fixed. In the event of the cables 11a and 11b accidentally breaking away from or becoming detached from the fixing points 4a and 4b, the above-described danger to the area around the lifted Magnus rotor 2 can occur, as described hereinbefore, and for that reason secure fixing of the cables 11a and 11b to the fixing points 4a and 4b is to be ensured.

In a fourth step the cables 11a and 11b are to be tightened, that is to say tensioned. For that purpose it is firstly necessary to ensure that there is no longer any operating personnel in the interior of the Magnus rotor 2 to be lifted, or on the Magnus rotor. In addition the cables 11a and 11b are to be tightened to such an extent that they do not hang down and can securely carry the weight of the Magnus rotor 2, in the event of release of the fixing between the Magnus rotor 2 and its underlying support structure, without the Magnus rotor 2 being able to tip over. In that respect in particular care is to be taken to ensure that the cables 11a and 11b are tightened to such an extent that no impulse force is applied to the cables 11a and 11b by tilting of the released Magnus rotor 2, as it is precisely such impulse force that can lead to the cables 11a and 11b ripping.

In a fifth step now the fixings between the carrier 4 and the base plate 20 or the ship or the like are released and removed. In addition all other connections, for example for the feed to or discharge of media and energy, which are fed to the Magnus rotor 2 from the exterior, such as for example the power supply to the motor 15, the control 16 or the inverter 17, are released and removed. When that has been done the Magnus rotor 2 stands by virtue of its own weight on the base plate 20 or the deck of the ship and is securely held against lateral tilting or slipping, by the cables 11a and 11b.

In a sixth step the Magnus rotor 2 can be lifted by a crane 12a, 12b, 12c by means of the cables 11a and 11b, and displaced, that is to say removed from the base plate 20 or the deck of the ship. In that case the Magnus rotor 2 can then be set down on another base plate or the like and secured there by fixing means. In that case, according to the invention, the Magnus rotor 2 is removed as an entire system, that is to say together with the motor 15, the control 16 and the inverter 17 which are provided in the interior of the carrier 4. That means that, according to the invention, removal of a Magnus rotor 2 can be carried out without a change in the Magnus rotor 2 system, that is to say without the individual components such as for example the rotating part 8, the inwardly disposed carrier 4, the motor 15, the control 16 and the inverter 17 being separated from each other. That is advantageous as they are matched to each other and such matching can be retained by replacement of the Magnus rotor 2 as a whole, that is to say it remains unchanged.

To effect interchange of two Magnus rotors 2 for each other, a second Magnus rotor 2 is now to be conveyed to the location of the removed first Magnus rotor 2. That is effected by reversing the above-indicated steps for that second Magnus rotor 2.

The removed first Magnus rotor 2 can now be maintained, restored or renewed, for example on land, in a suitable maintenance and repair installation. In that respect it is advantageous for those measures firstly not to be carried out on a rolling ship in the mounted condition of the Magnus rotor 2, and secondly in an installation designed for that purpose. Thus the movement of the ship, even in port, can make it difficult to carry out the working operations on the Magnus rotor 2, and delay them. In addition for that purpose the operating personnel, their tools and materials and in particular spare parts would have to be provided in the port in question in which the ship is berthed. In addition, not all regions and component parts are accessible in the case of a mounted Magnus rotor 2, that is to say which is ready for operation. Furthermore the interior of the bearing 6 would then be exposed to the weather, which would not be conducive to repair or maintenance of the bearing 6. Finally spare parts may also be required, which can be transported with a disproportionate amount of complication and expenditure.

It is therefore advantageous to be able to remove the Magnus rotor 2 as a whole. Thus the ship can be immediately equipped with a second Magnus rotor 2 and can put to sea again while the first exchanged Magnus rotor 2 remains in port in the maintenance and repair installation. It is thus possible in that way to avoid a ship berthing time caused by the need for maintenance or repair, so that its economy can be improved. In addition the first replaced Magnus rotor 2 can be maintained or restored in a suitable maintenance and repair installation more easily, better, quicker and more advantageously, than when those measures are performed in the mounted condition on a ship. It is also advantageous in that respect that the entire Magnus rotor 2 can be removed and replaced as a system, that is to say with the components in the interior of the carrier 4, being the motor 15, the control 16 and the inverter 17, as both the mechanical and also the electrical components of each Magnus rotor 2 are matched to each other and replacement of individual components, insofar as that would be in any way possible by virtue of their arrangement, in particular in the interior of the carrier 4, would nullify that matching and would make it necessary to implement re-matching, which in part is highly complicated and expensive, after the replacement operation.

The idea of the invention concerns the drive for a Magnus rotor, which is not located at the bottom of the Magnus rotor but at half its height and not on the outside but on the inside. That drive has a belt drive.

The invention also concerns a ship (cargo ship) having at least one (preferably four) Magnus rotors on the deck of the ship.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A Magnus rotor, comprising:
    a rotor body having an interior;
    a carrier arranged in the interior of the rotor body;
    a bearing having an opening, the bearing rotatably coupling the rotor body to the carrier, the rotor body being configured to rotate about the carrier;
    a shaft arranged to extend through the opening of the bearing, the shaft being connected to the rotor body above the bearing, the shaft having a first gear;
    a motor arranged in an interior of the carrier, the motor having a second gear that drives in rotation a toothed belt that drives the shaft in rotation by the first gear; and
    a tensioning device that is coupled to the carrier, the motor being on the tensioning device, the tensioning device being configured to be displaced radially to adjust tensioning of the toothed belt.

2. The Magnus rotor according to claim 1 further comprising a housing that at least laterally, upwardly, and radially encloses at least one of the motor, the first gear, the toothed belt, the second gear, and a part of the shaft that is arranged in the interior of the carrier.

3. The Magnus rotor according to claim 1 further comprising:
    at least one fixing point at a top side of the motor,
    at least one fixing point inside the carrier and located above the motor, and
    wherein provided between the fixing point of the motor and the fixing point of the carrier is a cable for transmitting the force due to the weight of the motor by way of the fixing point of the motor to the fixing point of the carrier.

4. The Magnus rotor according to claim 1, further comprising:
    a shaft fixing device provided at the upper end of the shaft above the bearing, and
    a rotor fixing device connecting the shaft fixing device to the rotor.

5. The Magnus rotor according to claim 1, further comprising:
    a guide roller arranged at a lower outer periphery of the rotor body that bears play-free against the rotor body,
    a walkway surface arranged beneath the guide roller, and
    a cover that covers the guide roller and the walkway surface, wherein when opened the cover exposes the guide roller and the walkway surface.

6. The Magnus rotor according to claim 5 wherein the walkway surface is one of a base plate or a deck of a ship on which the Magnus rotor is fixed.

7. The Magnus rotor according to claim 5 wherein the walkway surface is coated with a nonslip material.

8. The Magnus rotor according to claim 5 wherein the cover has a motion device adapted to hold the cover in an opened position at a vertical height above the walkway surface.

9. The Magnus rotor according to claim 8 wherein the motion device holds the cover open in a substantially radial direction of the rotor body.

10. The Magnus rotor according to claim 5 wherein the motion device is secured in a closed position of the cover by an arresting device.

11. A ship comprising:
at least one Magnus rotor secured to the deck of the ship, each Magnus rotor including:
   a rotor body having an interior;
   a carrier arranged in the interior of the rotor body;
   a bearing having an opening, the bearing rotatably coupling the rotor body to the carrier, the rotor body being configured to rotate about the carrier;
   a shaft arranged to extend through the opening of the bearing, the shaft being connected to the rotor body above the bearing, the shaft having a first gear;
   a motor arranged in an interior of the carrier, the motor having a second gear that drives in rotation a toothed belt that drives the shaft in rotation by the first gear; and
   a tensioning device that is coupled to the carrier, the motor being on the tensioning device, the tensioning device being configured to be displaced radially to adjust tensioning of the toothed belt.

12. The ship according to claim 11 further comprising:
at least one fixing point at a top side of the motor; and
at least one fixing point inside the carrier and located above the motor, wherein provided between the fixing point of the motor and the fixing point of the carrier is a cable for transmitting the force due to the weight of the motor by way of the fixing point of the motor to the fixing point of the carrier.

13. The ship according to claim 11, further comprising:
a shaft fixing device provided at the upper end of the shaft above the bearing, and
a rotor fixing device connecting the shaft fixing device to the rotor.

14. A Magnus rotor, comprising:
a rotor body having a rotor interior portion;
a carrier having a carrier interior portion, the carrier being located in the rotor interior portion;
a bearing rotatably coupling the rotor body to the carrier, the bearing having an opening extending therethrough;
a shaft extending through the opening of the bearing, an upper end of the shaft being connected to the rotor body above the bearing;
a motor located in the carrier interior;
a belt coupled to the shaft and the motor, the motor being configured to rotate the shaft by the belt and
a tensioning device located in the carrier interior, the motor being positioned on the tensioning device, the tensioning device being configured to adjust a tension of the belt by moving the motor towards or away from the shaft.

15. The Magnus rotor according to claim 14 wherein the upper end of the shaft is connected to the rotor body by a hub that extends from an inner surface of the rotor body to the shaft.

16. The Magnus rotor according to claim 14 wherein the rotor body, the bearing, and the shaft are concentric.

* * * * *